United States Patent
Mehringer

(10) Patent No.: US 10,003,188 B2
(45) Date of Patent: Jun. 19, 2018

(54) METHOD FOR OPERATING AN ACTIVE CONVERTER CONNECTED TO AN ELECTRIC MACHINE, AND MEANS FOR IMPLEMENTING SAME

(71) Applicant: SEG AUTOMOTIVE GERMANY GMBH, Stuttgart (DE)

(72) Inventor: Paul Mehringer, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 0 days. days.

(21) Appl. No.: 15/550,100

(22) PCT Filed: Jan. 14, 2016

(86) PCT No.: PCT/EP2016/050647
§ 371 (c)(1),
(2) Date: Aug. 10, 2017

(87) PCT Pub. No.: WO2016/128165
PCT Pub. Date: Aug. 18, 2016

(65) Prior Publication Data
US 2018/0041025 A1    Feb. 8, 2018

(30) Foreign Application Priority Data

Feb. 11, 2015 (DE) .................. 10 2015 202 437

(51) Int. Cl.
*H02H 7/125* (2006.01)
*H02P 9/10* (2006.01)
(Continued)

(52) U.S. Cl.
CPC ........... *H02H 7/1252* (2013.01); *H02P 9/102* (2013.01); *H02P 29/0241* (2016.02);
(Continued)

(58) Field of Classification Search
CPC ..... H02H 7/125; H02H 7/1252; H02M 7/003; H02M 7/219; H02M 7/062; H02M 5/4585;
(Continued)

(56) References Cited

U.S. PATENT DOCUMENTS

2014/0191698 A1* 7/2014 Magini ............... H02M 7/5395
318/503
2014/0232305 A1* 8/2014 Magini .................. H02P 25/22
318/400.2
(Continued)

FOREIGN PATENT DOCUMENTS

DE    102006047243 A1    11/2007
DE    102011006316 A1    10/2012
(Continued)

OTHER PUBLICATIONS

International Search Report dated May 3, 2016 of the corresponding International Application PCT/EP2016/050647 filed Jan. 14, 2016.

*Primary Examiner* — Adolf Berhane
(74) *Attorney, Agent, or Firm* — Norton Rose Fulbright US LLP; Gerard Messina

(57) ABSTRACT

In an active converter that is connected to an electric machine, in which arresting circuits for activating a voltage arrest beginning at a first point in time are provided, and which is also configured for activating a load shedding reaction only when activation conditions are fulfilled beginning at a second point in time, the activation conditions include determining that the voltage arrest is still activated at the second point in time, that a voltage potential has not yet fallen below the first threshold value, and/or that a value that indicates a current flowing through at least one phase connection is above a third threshold value.

10 Claims, 8 Drawing Sheets

(51) Int. Cl.
*H02P 29/024* (2016.01)
*H02P 9/48* (2006.01)
*H02P 9/12* (2006.01)
*H02J 7/14* (2006.01)

(52) U.S. Cl.
CPC .............. *H02J 7/1438* (2013.01); *H02P 9/12* (2013.01); *H02P 9/48* (2013.01)

(58) Field of Classification Search
CPC .......... H02M 7/217; H02M 7/00; H02M 7/04; H02P 29/024; H02P 9/102; H02J 7/1438
USPC ......... 363/50, 52, 53, 84, 125, 127; 318/434
See application file for complete search history.

(56) References Cited

U.S. PATENT DOCUMENTS

| | | | |
|---|---|---|---|
| 2014/0343739 A1 | 11/2014 | Masson et al. | |
| 2016/0211740 A1* | 7/2016 | Schueler | H02P 25/22 |
| 2016/0329827 A1* | 11/2016 | Otte | H03K 17/22 |
| 2017/0163168 A1* | 6/2017 | Mehringer | H02M 7/003 |
| 2018/0026473 A1* | 1/2018 | Mehringer | H02J 7/1438 |

FOREIGN PATENT DOCUMENTS

| | | |
|---|---|---|
| DE | 102013213802 A1 | 1/2015 |
| DE | 102013223316 A1 | 5/2015 |
| DE | 102015208302 A1 | 1/2016 |
| WO | 2015078685 A1 | 6/2015 |

\* cited by examiner

METHOD FOR OPERATING AN ACTIVE CONVERTER CONNECTED TO AN ELECTRIC MACHINE, AND MEANS FOR IMPLEMENTING SAME

CROSS-REFERENCE TO RELATED APPLICATIONS

The present application is the national stage of International Pat. App. No. PCT/EP2016/050647 filed Jan. 14, 2016, and claims priority under 35 U.S.C. § 119 to DE 10 2015 202 437.7, filed in the Federal Republic of Germany on Feb. 11, 2015, the content of each of which are incorporated herein by reference in their entireties.

FIELD OF THE INVENTION

The present invention relates to a method for operating an active converter connected to an electric machine, and a system, a processor, and computer program for implementing the method.

BACKGROUND

Converters of various designs operated as rectifiers may be used for feeding direct current systems out of three-phase current sources, in particular of motor vehicle electrical systems using three-phase current generators. Converters having a six-, eight-, or ten-pulse design are generally used in motor vehicle electrical systems, corresponding to the three-, four-, or five-phase current generators which are usually installed. However, the present invention is also suitable for converters having other numbers of phases or pulses.

When reference is made below to a generator for the purpose of simplicity, this can also be an electric machine which is operable in a generator mode and a motor mode, for example a so-called starter generator. In the following discussion, a converter is understood to mean a bridge circuit of a known type, which operates as a rectifier in a generator mode of the electric machine. For simplicity, reference is also made below to a rectifier. A system made up of an electric machine that is at least operable in generator mode and a corresponding converter that operates as a rectifier is also referred to below as a current supply device.

So-called load shedding (dumping) is a critical operating condition for such current supply devices. Load shedding occurs when, for a highly excited electric machine and a correspondingly high delivered current, the load on the electric machine or the converter suddenly decreases. Load shedding may result from a disconnection of consumers in the connected motor vehicle electrical system, or from a cable break.

When consumers are suddenly disconnected in a motor vehicle electrical system, in particular during battery-free operation, due to the inductance of the excitation winding and the excitation field, which therefore decreases only slowly, for up to one second the electric machine may supply more energy than the motor vehicle electrical system is able to receive. If it is not possible to intercept or completely intercept this energy by capacitive elements in the motor vehicle electrical system or in the converter, overvoltages and overvoltage damage to components in the motor vehicle electrical system may occur.

In the event of a cable break, as a result of which the motor vehicle electrical system is disconnected from the converter, the electric machine likewise continues to supply energy, but a consumer is no longer connected. In comparison to the case just discussed for the disconnection of consumers, the consumers are thus no longer endangered. The consumers can also continue to be supplied by the battery. However, as the result of overvoltages, in such cases the power electronics of the electric machine or of the converter may be damaged.

In conventional (passive) converters, in each case a certain amount of protection of the vehicle electrical system or the power electronics of the electric machine and of the converter is provided by the converter itself, namely, with the aid of the Zener diodes, installed there in the classical case, in which the overvoltage is arrested and the excess energy is converted into heat. The use of additional arresting elements is also known in this regard.

However, the use of active or controlled bridge converters is desirable in motor vehicles since, among other reasons, active converters, in contrast to passive or uncontrolled converters, have lower power losses during normal operation.

SUMMARY

As mentioned above, the use of active or controlled bridge converters is desirable in motor vehicles. However, presently available controllable or active current control valves for active converters, for example field effect transistors, have no integrated arresting function with sufficient robustness, as is the case for conventional Zener diodes, and therefore are not able to intercept the overvoltage. For this reason, additional protective strategies are important in active converters.

During load shedding, for example the generator phases may be short-circuited by temporarily conductively connecting some or all current control valves of the upper or lower branch of a corresponding converter. This takes place in particular on the basis of an evaluation of the vehicle electrical system voltage present at the direct voltage terminals of the converter. If the vehicle electrical system voltage exceeds a predefined upper threshold value, a corresponding short circuit is initiated and the vehicle electrical system voltage drops. If the vehicle electrical system voltage subsequently falls below a predefined lower threshold value, the short circuit is eliminated and the vehicle electrical system voltage rises again. Thus, the vehicle electrical system voltage oscillates between the upper and the lower threshold value until the excitation field has died down.

An electric machine having an excitation field that has (at least largely) died down is also referred to below as "de-energized," and an electric machine having an excitation field that has not, or has hardly, died down is referred to as "energized." When it is stated below that a "phase short circuit is initiated," this is understood to mean that, as explained, the current control valves of the upper or of the lower branch of a converter are conductively connected. A corresponding phase short circuit is "eliminated" when the regular active rectification, for example using the known pulse width modulation control or block control, is resumed.

In the explained methods, a continuous change, which is no longer terminatable in a conventional manner, between active rectification and phase short circuits can result. Since in the event of a cable break, capacitively acting elements in the vehicle electrical system are no longer available and the capacitive elements present in the converter are comparatively small, small amounts of energy are sufficient to once again raise the vehicle electrical system voltage (of the remaining system not disconnected due to the cable break) in such a way that the threshold value used for initiating the phase short circuits is exceeded. Therefore, the method no longer "comes to rest," i.e., does not go, or goes only in a very delayed manner, back into continuous active rectification. This problem is also explained below with reference to the figures.

Converters in which, in addition to means for activating such a shedding reaction in the form of phase short circuits, a voltage arrest is provided, are also affected by this problem. Appropriate arresting circuits are configured for intercepting voltage peaks before a load shedding reaction in the form of phase short circuits is able to take effect. A voltage arrest brought about by the arresting circuits is activated beginning at a point in time after the vehicle electrical system voltage or a corresponding voltage potential increases up to a predefined threshold value, and is kept activated for as long as the voltage potential does not fall below the threshold value. Due to the arresting, the vehicle electrical system voltage no longer increases above the threshold value defined, at least temporarily, as safe. Such voltage arrest in converters, in which phase short circuits are also used, typically includes controlling the current control valves in the branch of the converter not used for the phase short circuits, and thus, establishing a conducting connection between the phase terminals connected to these current control valves, and the corresponding direct voltage terminal.

The approaches known from the related art, as mentioned, have not always proven satisfactory, in particular for cable breaks, so that for such cases there is a need for improved protective strategies.

The present invention is directed to operation of an active converter that is connected to an electric machine.

A core of the present invention is to establish, in the cases explained at the outset, of load shedding due to a cable break, whether a further activation of a load shedding reaction in the form of phase short circuits is necessary, or whether the load shedding reaction may be terminated. As mentioned, in the explained methods a continuous change, which is no longer terminatable in a conventional manner, between active rectification and phase short circuits can result solely from the effects of the low remaining capacitances, even when the electric machine used is already (largely) de-energized.

Within the scope of the present invention, options are provided which allow recognition of cases in which the electric machine is already de-energized or largely de-energized, and therefore no further activation of phase short circuits is necessary. In this way, the present invention allows a more rapid, or even renewed, transition into the rectification and termination of the repeated cycles of regular rectification and phase short circuits. This results in advantageous operation of a corresponding vehicle electrical system, even after a cable break.

The present invention provides a method for operating an active converter that is connected to an electric machine. In the converter, as is known, a number of phase terminals are in each case connected to a first direct voltage terminal via a controllable current control valve in a first converter branch, and to a second direct voltage terminal via a controllable current control valve in a second converter branch. Within the scope of the present patent application, a "controllable current control valve" is a (power) transistor, in particular a metal oxide field effect transistor, of known design. A "first converter branch" includes the totality of the current control valves connected to the first direct voltage terminal, and a "second converter branch" includes the totality of the current control valves connected to the second direct voltage terminal. If, for example, a positive battery terminal is connected to the first direct voltage terminal and a negative battery terminal or ground is connected to the second direct voltage terminal, the first converter branch is the "high-side" or "upper" branch of the converter, and the second converter branch is the "low-side" or "lower" branch of the converter.

Each of the current control valves of one of the two converter branches is provided with an arresting circuit that is configured for activating a voltage arrest beginning at a first point in time after which a voltage potential present at the first direct voltage terminal or a voltage, i.e., a vehicle electrical system voltage, present between the first and the second direct voltage terminals, increases up to a predefined first threshold value, and keeping the voltage arrest activated as long as the voltage potential does not drop below the first threshold value. The voltage arrest includes controlling the current control valve provided with the arresting circuit and thus establishing a conducting connection between the phase terminal connected to this current control valve, and the particular direct voltage terminal.

The converter is also configured for activating a load shedding reaction only when activation conditions are additionally fulfilled, beginning at a second point in time when the voltage potential is above a second threshold value at the second point in time. The second point in time is after the first point in time, and the second threshold value is below the first threshold value. The load shedding reaction includes controlling all current control valves of the other of the two converter branches and thus establishing a conducting connection between all phase terminals. The first point in time is established by the point in time when the vehicle electrical system voltage, i.e., the mentioned voltage potential, reaches the first threshold value, and corresponds to the point in time at which an arresting function is activated. The second point in time can be a predefined time period (dead time) after the first point in time, for example 50 microseconds.

Within this time period between the first and the second points in time, an arresting function does not have to be continuously activated, in particular when the vehicle electrical system voltage has already once again dropped below the first threshold value after a very short time.

The voltage arrest thus takes place in the branch of the converter that is not used for the phase short circuits, and vice versa. Thus, when the phase short circuits are brought about in the lower branch of the converter ("low side"), the voltage arrest takes place in the upper branch of the converter ("high side"), and vice versa. The "first" direct voltage terminal typically corresponds to a positive battery terminal, and the "second" direct voltage terminal corresponds to a negative battery terminal or ground.

According to the present invention, it is provided that the activation conditions for activating the load shedding reaction include determining that the voltage arrest is still activated at the second point in time, and/or the voltage potential has not yet dropped below the first threshold value, and/or a value that indicates a current flowing through at least one of the phase terminals is above a third threshold value. The three mentioned criteria, referred to within the scope of the present patent application as "activation conditions," are particularly suited, as has been recognized according to the present invention, for determining whether the electric machine is already sufficiently de-energized. If at the second point in time the voltage arrest is still activated, and/or if the voltage potential has not yet dropped below the first threshold value, and/or if the value that indicates the current flowing through at least one of the phase terminals is above the third threshold value, the electric machine is not yet sufficiently de-energized. In other cases, the exciting current has already died down enough that further initiation of phase short circuits is no longer necessary. In these cases, an arresting function is sufficient for limiting overvoltages.

All mentioned criteria can be determined in an active converter itself. Recourse to, for example, values ascertained in a generator controller of the electric machine is not necessary.

In such a method, arresting circuits are advantageously used in which the first direct voltage terminal is connected via a threshold value circuit to a control terminal of the current control valve that is provided with the arresting circuit, the threshold value circuit activating the voltage arrest by establishing a conducting connection between the corresponding phase terminal and the direct voltage terminal when the voltage potential increases to the first threshold value, and keeping the voltage arrest activated by maintaining the conducting connection as long as the voltage potential does not drop below the first threshold value. The threshold value circuit is implemented in particular using one or multiple Zener diode(s) as threshold value elements, which on the cathode side are connected to the first direct voltage terminal and on the anode side are connected to the control terminal, for example the gate of a metal oxide field effect transistor. In this way the control terminal is controlled as long as the breakdown voltage of the Zener diode(s) is exceeded.

As explained below with reference to FIG. 5, an additional circuit at a corresponding threshold value circuit can detect whether current is flowing through the threshold value circuit. For an electric machine that is still (largely) energized, this is the case until the mentioned load shedding reaction is initiated at the second point in time. An appropriate current thus flows at the second point in time. In contrast, for a (largely) de-energized electric machine, the vehicle electrical system voltage drops very soon after the activation of the arresting function, and at the second point in time, at which the mentioned load shedding reaction is conventionally initiated, such current no longer flows. This is also explained with reference to FIGS. 2 and 3. The method thus advantageously provides for determining that the voltage arrest is still activated at the second point in time by ascertaining whether a current is flowing across the threshold value circuit.

Alternatively, however, it can also be determined that the voltage potential has not yet dropped below the first threshold value at the second point in time by measuring the voltage potential at least at the second point in time. This allows corresponding additional circuits to be dispensed with, since means for measuring the voltage are already present for activating the load shedding reaction, and therefore in the simplest case only one or multiple additional measuring times have to be defined. As mentioned, and explained below, it is a characteristic of a (largely) de-energized electric machine that the voltage potential at the second point in time has dropped to a value that is below the value at the first point in time. In contrast, for an electric machine that is still (largely) energized, the voltage potential remains essentially constant between the first and the second point in time. It has therefore proven to be particularly advantageous to measure the voltage potential between the first point in time and the second point in time so that its curve can be detected.

According to the third alternative stated above, the value that indicates the current flowing through the at least one phase terminal at the second point in time is advantageously ascertained based on a current measurement in the at least one phase terminal. It has been shown that for a (largely) de-energized electric machine, the phase currents drop to very low values (close to 0 amperes) at the second point in time, but not for a (largely) energized electric machine. Therefore, a phase current measurement allows a reliable determination of whether the electric machine is already sufficiently de-energized, so that a further initiation of load shedding reactions can be dispensed with. Advantageous embodiments can include ascertaining the value that indicates the current flowing through the at least one phase terminal at the second point in time, based on a maximum value of the current flowing through the at least one phase terminal or based on a sum of the positive current components in at least two phase terminals. A direct detection of the phase currents, for example via measuring shunts in the phase branches, can be provided. As soon as the maximum measured phase current or the sum of the positive phase current components falls below a value to be determined, the mentioned third threshold value, setting further phase short circuits can be dispensed with. The third threshold value is advantageously ascertained based on the speed and the thermal properties of the electric machine, a value of essentially 0 amperes always being possible.

A processing unit according to the present invention, such as a control unit of a current supply device or of an active converter, is configured, in particular by programming, for carrying out a method according to the present invention.

In addition, the implementation of the method in the form of software is advantageous, since this entails particularly low costs, in particular when an executing control unit can also be used for other tasks, and therefore is present anyway. Suitable data media for providing the computer program are in particular diskettes, hard drives, flash memories, EEPROMs, CD-ROMs, DVDs, and others. In addition, downloading a program via computer networks (Internet, intranet, etc.) is possible.

Further advantages and embodiments of the present invention result from the description and the appended drawings.

It is understood that the features mentioned above and to be explained below can be used not only in the particular stated combination, but also in other combinations or alone without departing from the scope of the present invention.

The present invention is schematically illustrated in the drawings based on exemplary embodiments, and is described below with reference to the drawings.

DETAILED DESCRIPTION

Figure 1:
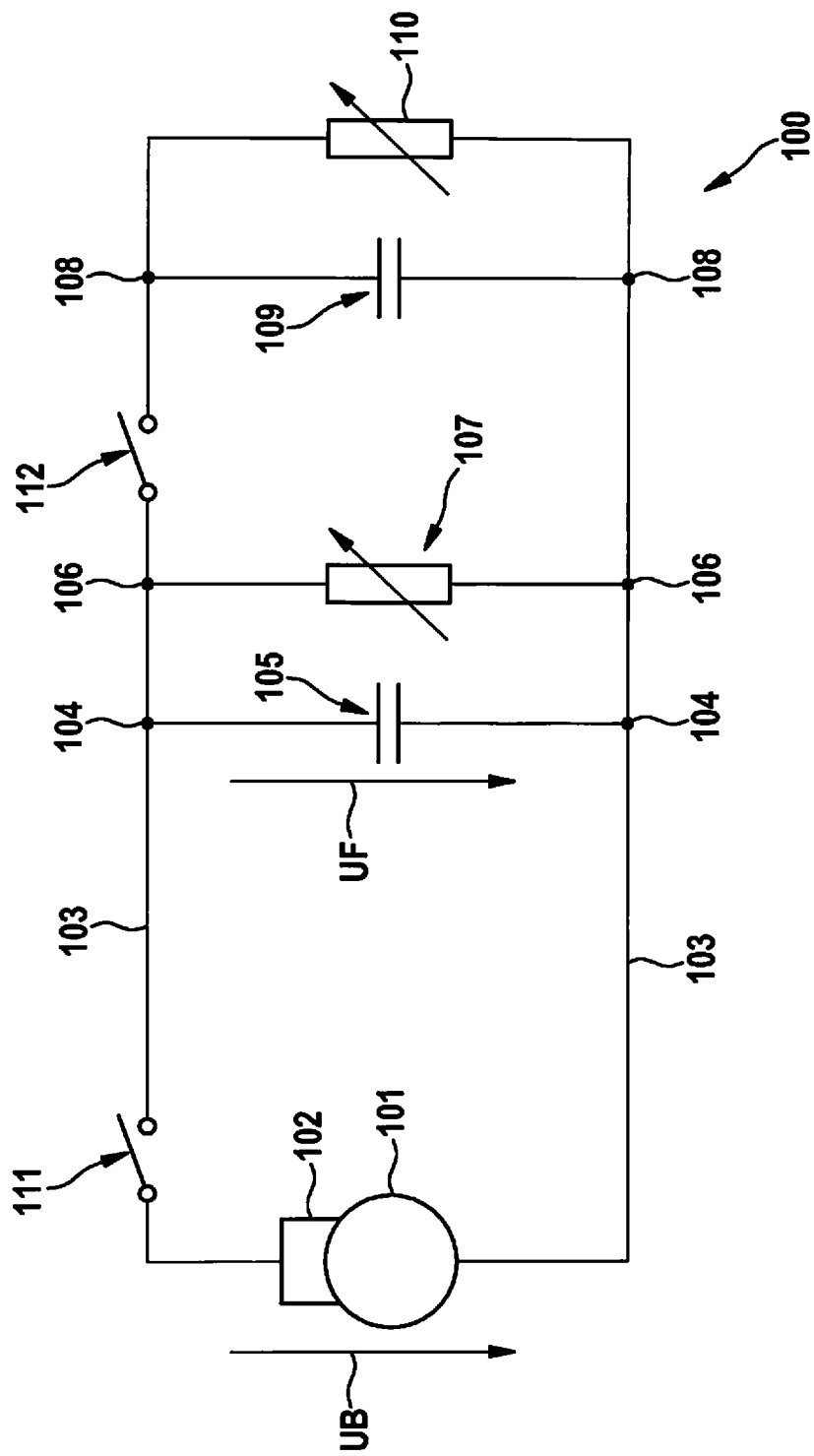
FIG. 1 shows load shedding events based on a simplified equivalent circuit diagram of a motor vehicle electrical system, according to an example embodiment of the present invention.

FIG. 1 shows various load shedding events with reference to an equivalent circuit diagram 100 of a motor vehicle electrical system.

Figure 8:
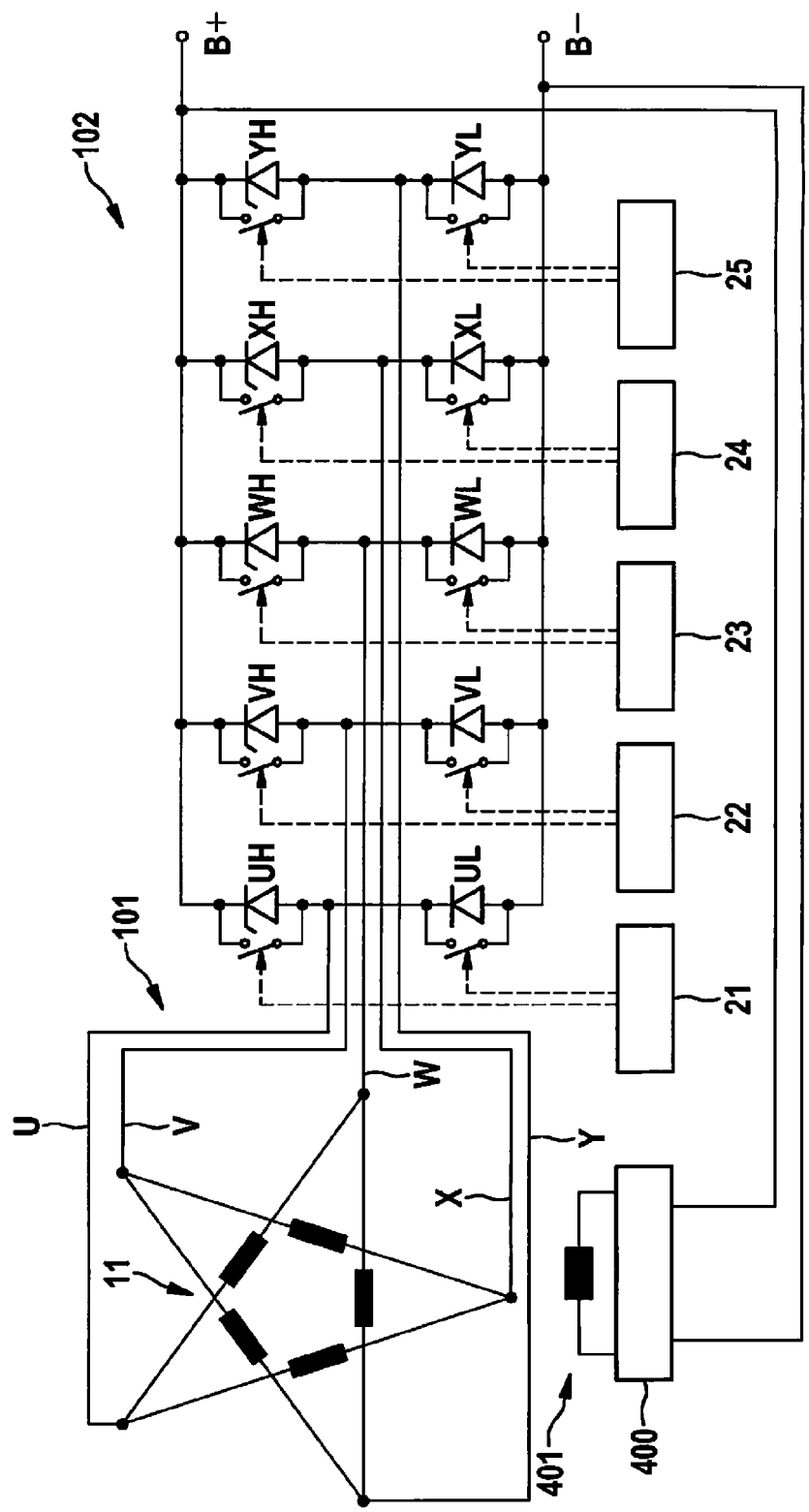
FIG. 8 shows an electric machine together with an active converter connected thereto, in a schematic illustration, according to an example embodiment of the present invention.

Equivalent circuit diagram 100 represents an electric machine 101 that operates as a generator, together with an associated active converter 102. Reference is made to FIG. 8 for details. Electric machine 101 and converter 102 are each connected to switching points 104 via cables 103 in each case having a length of 1.5 meters and a cross section of 25 square millimeters, for example. A capacitor 105, such as one that is present, for example, at a jump start assistance point of a vehicle, is connected between switching points 104. In an actual vehicle electrical system, switching points 104 are provided for jump starting the motor vehicle. A resistive load 107 is symbolically depicted between further switching points 106. A further capacitor 109, which represents a vehicle electrical system capacitor, is integrated between yet further switching points 108, between which a further resistive load 110 is symbolically depicted.

Switches 111 and 112 are not present in an actual vehicle electrical system, and depict the states that occur during load shedding, as explained below. The normal operation of such a vehicle electrical system, i.e., without load shedding, corresponds to a closed (conducting) state of switches 111 and 112. A voltage UB is present at electric machine 101 and converter 102, as depicted by an appropriately inscribed arrow. Voltage UB is referred to below as the vehicle electrical system voltage. The vehicle electrical system voltage is present at the outputs of converter 102 on the direct voltage side, whereby one of these outputs can also be connected to ground. In this case, the vehicle electrical system voltage results as the potential difference between ground and the other output of converter 102 on the direct voltage side. The voltage dropping across capacitor 107 is likewise depicted by an arrow, and is denoted by reference character UF.

The state without load shedding, as mentioned, corresponds to a closed state of switches 111 and 112. Electric machine 101 delivers via converter 102 a current to the vehicle electrical system depicted in FIG. 1, which results from the load resistances of resistive loads 107 and 110. Load shedding can now be depicted by the opening of one of switches 111 and 112. Opening switch 111 corresponds to a cable break at converter 102. In contrast, opening switch 112 depicts load shedding, as caused by switching off resistive load 110 in the vehicle electrical system. In the latter case, i.e., a load disconnection, the magnitude of the shed load current depends on the load resistance of the shed resistive load 110, and the magnitude of the remaining vehicle electrical system current depends on the load resistance of resistive load 107.

Figure 2:
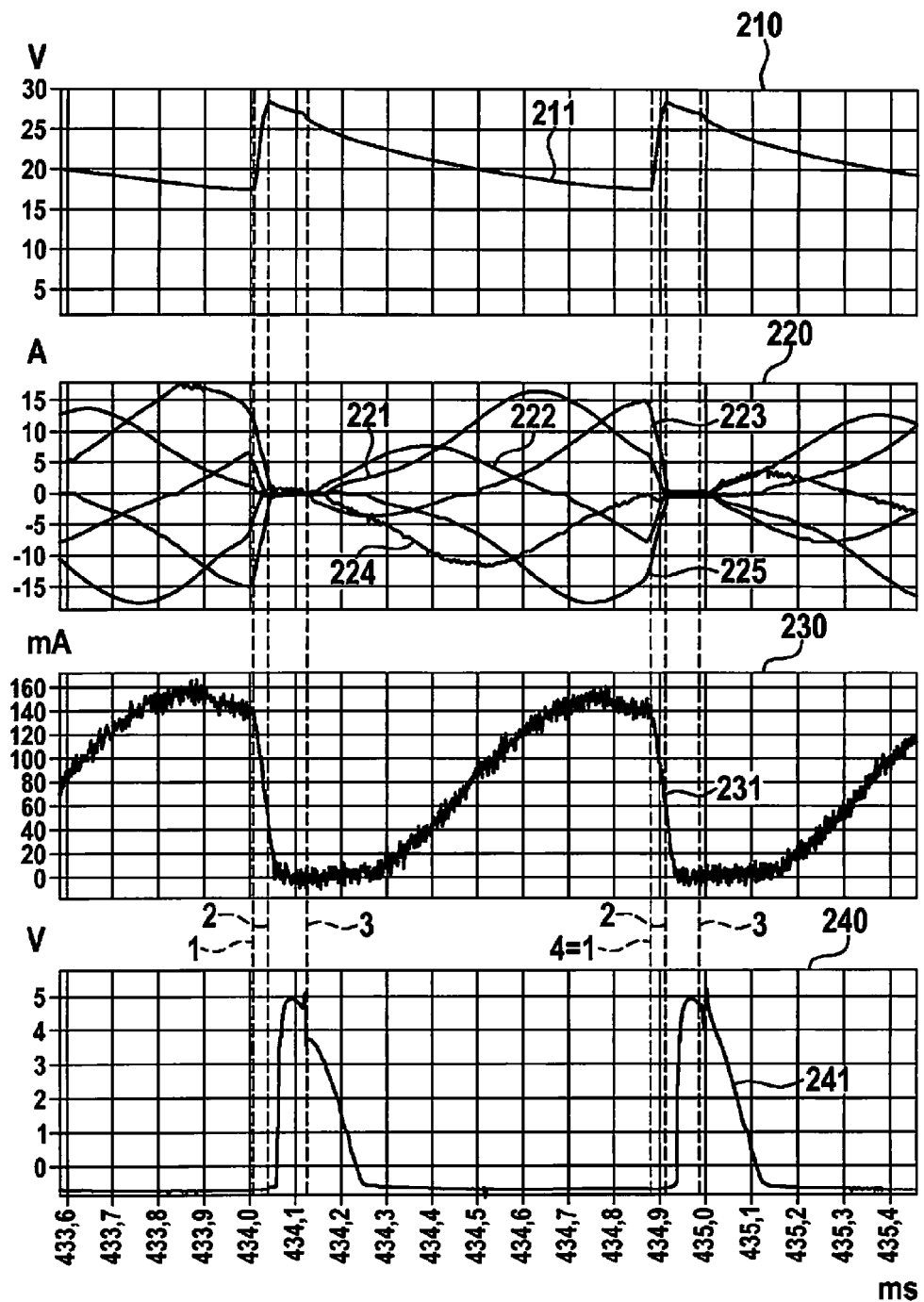
FIG. 2 shows current and voltage curves during a load shedding reaction in the event of a cable break and a de-energized electric machine.

FIG. 2 depicts voltage and current curves in four diagrams 210 through 240, in volts or amperes or milliamperes, on the particular ordinate with respect to a shared time axis in milliseconds on the abscissa. Three characteristic points in time, passing through all diagrams, are denoted by reference numerals 1 through 4 in diagrams 210 through 240. Diagrams 210 through 240 each concerns the case of a cable break (corresponding to opening switch 111 according to preceding FIG. 1), for exciting current which has (largely) died down in an electric machine operating as a generator, for example electric machine 101 according to FIG. 1. This electric machine is assumed to be a five-phase electric machine in the following discussion. However, as mentioned, the present invention is also suitable for electric machines having other numbers of phases.

Diagram 210 depicts curve 211 of the vehicle electrical system voltage, for example voltage UB according to FIG. 1. Diagram 220 depicts curves 221 through 225 of the phase currents of the electric machine, which as mentioned is assumed here to have five phases. Diagram 230 shows the variable curve 231 (which in the present case varies in the milliampere range) of the exciting current due to the excitation winding of the electric machine, and diagram 240 shows a curve 241 of a voltage that is present at the excitation winding. For further explanation of diagrams 230 and 240 or of curves 231 and 241, additional reference is made to FIG. 4, explained below.

During the entire time period depicted in diagrams 210 through 240, load shedding due to a cable break is present. At time 1, it is decided, for example due to a drop in the vehicle electrical system voltage that is regarded as sufficient, depicted by curve 211 in diagram 210, that a phase short circuit may be terminated. Thus, prior to time 1 a phase short circuit is still present.

Figure 5:
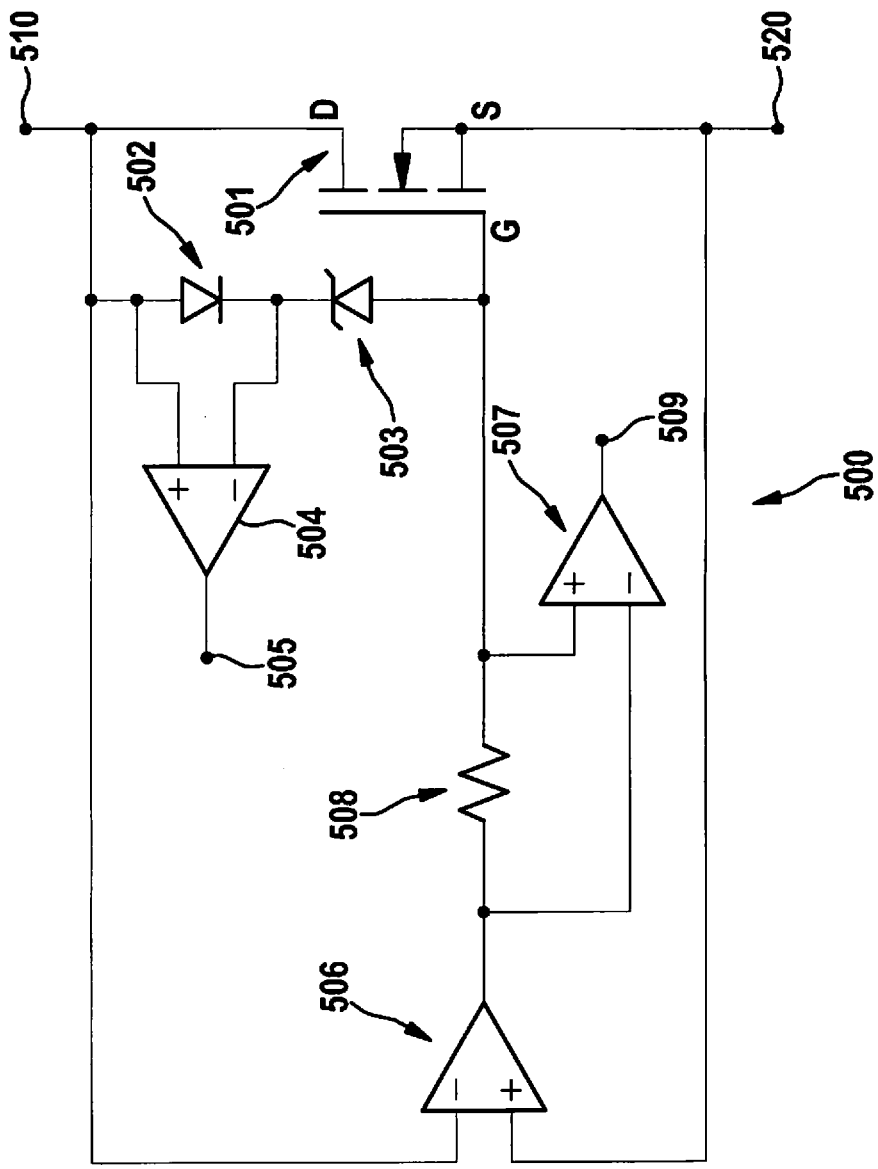
FIG. 5 shows an additional circuit of a current control valve of an active converter, in a schematic illustration, according to an example embodiment of the present invention.

Beginning at time 1, a transition is made into regular rectification. An appropriate capacitance of for example 1 to 100 microfarads, for example a capacitor that is present in rectifier 102 or in controller 400 according to FIG. 1 between terminals B+ and B−, is initially charged. The charging takes place very quickly due to the comparatively low capacitance and the high generator currents. Arresting of this voltage in the converter therefore becomes active at time 2, at which the vehicle electrical system voltage, depicted by curve 211 in diagram 210, exceeds a threshold value (trigger threshold), which within the scope of the present patent application is referred to above and in the patent claims as the "first" point in time. Reference is made to FIG. 5, explained below, concerning details of such arresting. It is apparent that due to this measure, between times 2 and 3 the phase currents, depicted by curves 221 through 225 in diagram 220, and the exciting current, depicted by curve 231 in diagram 230, have already returned to the value zero. As is apparent from a comparison with FIG. 3, this represents a characteristic of a (largely) de-energized electric machine.

Figure 3:
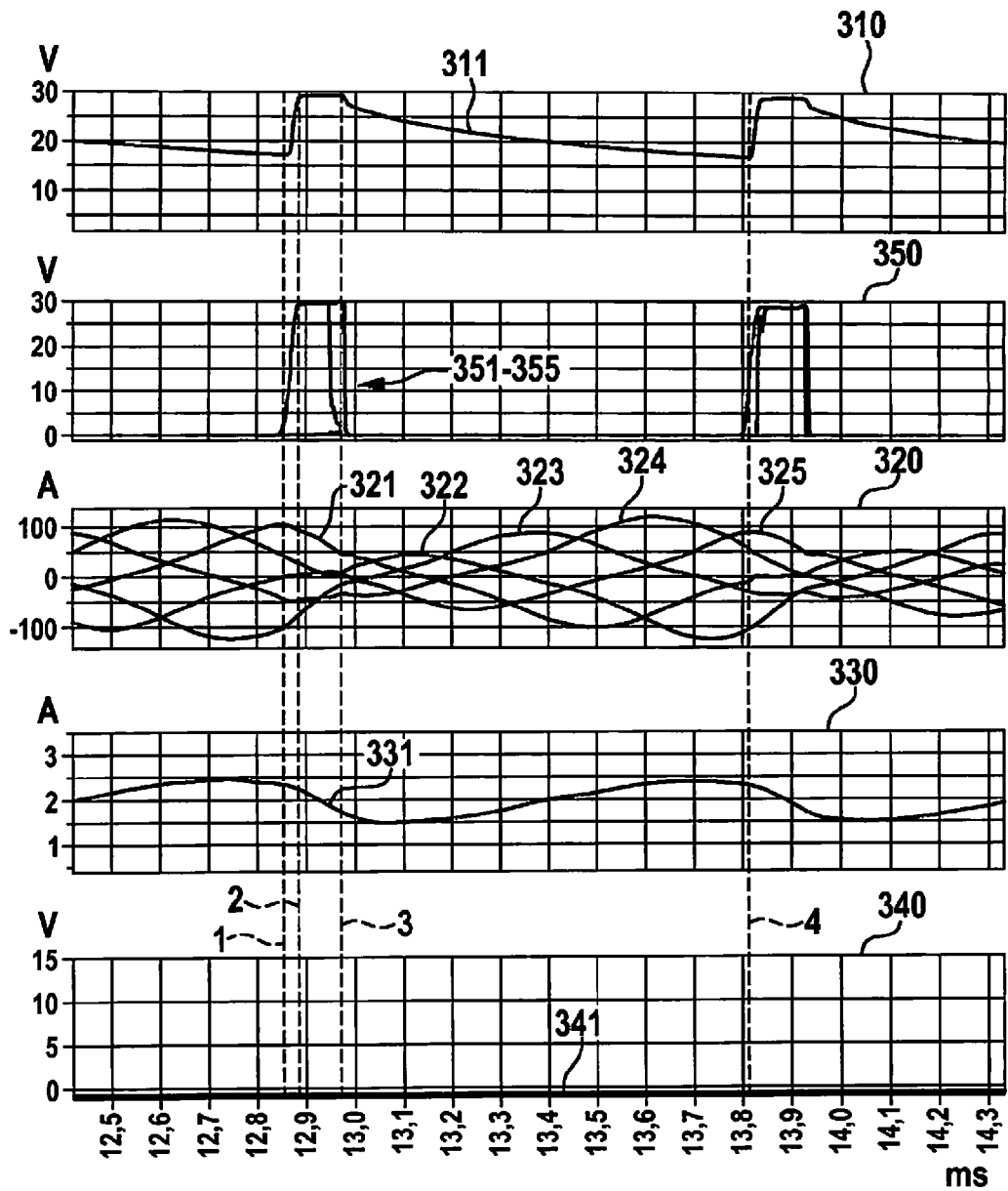
FIG. 3 shows current and voltage curves during a load shedding reaction in the event of a cable break and an energized electric machine.

The vehicle electrical system voltage, depicted by curve 211 in diagram 210, also drops, which represents a further characteristic of a (largely) de-energized electric machine, as is apparent from a comparison with FIG. 3. However, since the vehicle electrical system voltage is also above a threshold value that is defined for initiating phase short circuits (within the scope of the present patent application above and in the patent claims, referred to as the "second" threshold value), a phase short circuit is triggered at time 3 (within the scope of the present patent application above and in the patent claims, referred to as the "second" point in time). In the period between times 3 and 4 (after the "second" point in time), during the phase short circuit the vehicle electrical system voltage is decreased due to the current consumption of the converter and its controller. Since the electric machine experiences no countervoltage during the phase short circuit, the voltages thereby induced due to the residual remanence are sufficient to induce phase currents, as is apparent with reference to curves 221 through 225 in diagram 220. These phase currents even couple to the excitation circuit, as is apparent in diagram 230 with reference to curve 231 of the exciting current.

The phase short circuit is re-initiated at time 4. The energy temporarily stored in the phase currents is sufficient, at the low capacitance that is present, to once again increase the vehicle electrical system voltage, apparent in curve 211 in diagram 210, to a value that is above the trigger threshold, which in turn results in activation of the phase short circuit. The cycle according to FIG. 2 begins anew. It is apparent that such a cycle usually cannot be exited, even for a (largely) de-energized electric machine.

FIG. 3 depicts voltage and current curves in five diagrams 310 through 350, in volts or amperes or milliamperes, on the particular ordinate with respect to a shared time axis in milliseconds (abscissa). Here as well, the characteristic points in time, passing through all diagrams, are denoted by reference numerals 1 through 4 in diagrams 310 through 350. Diagrams 310 through 350 each concern the case of a cable break (corresponding to opening switch 111 according to preceding FIG. 1), for exciting current which has (largely) died down in an electric machine operating as a generator, for example electric machine 101 according to FIG. 1. Here as well, the electric machine is assumed to be a five-phase electric machine. However, as mentioned, the present invention is also suitable for electric machines having other numbers of phases.

Curves 311 through 341 illustrated in diagrams 310 through 340 in FIG. 3 correspond in their origin according to respective curves 211 through 241 illustrated in diagrams 210 through 240, and are indicated by reference numerals that are incremented by 100. In addition, phase voltages of the electric machine are shown in curves 351 through 355 in diagram 350.

During the entire time period depicted in diagrams 310 through 350, load shedding due to a cable break is present, as already explained with regard to FIG. 2. In addition, times 1 through 4 correspond to one another, so that the explanations for FIG. 2 apply here as well.

It is apparent from a review of FIGS. 2 and 3 that for de-energization of the electric machine that is not yet sufficient (according to FIG. 3), the vehicle electrical system voltage (compare curves 211 and 311) at time 3 ("second" point in time) still essentially corresponds to the value at time 2 ("first" point in time), and the phase currents (compare curves 221 and 321) are still much higher, and in particular at time 3 ("second" point in time) do not drop greatly to a value of essentially 0 amperes. In addition, when the electric machine is not yet sufficiently de-energized (according to FIG. 3), the voltage (compare curves 241 and 341) present at the excitation winding also remains stable at a value of less than 0 V. Observation of curves 241 and 341 is thus likewise suitable for distinguishing the cases from FIGS. 2 and 3, i.e., for answering the question of whether the electric machine is already sufficiently de-energized, and thus could once again be continuously transferred into a regular rectifier operation.

Figure 4:
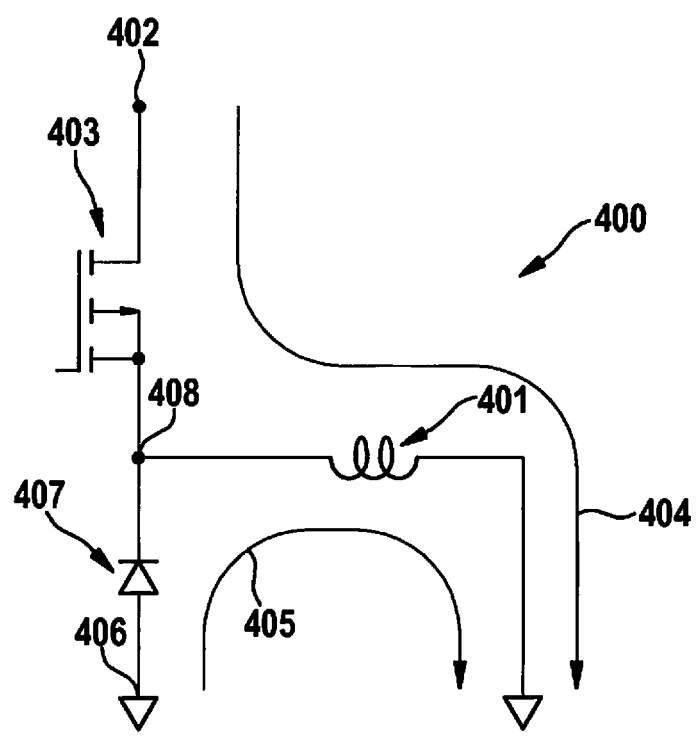
FIG. 4 shows the basic design of a voltage regulator of an electric machine in a schematic illustration, according to an example embodiment of the present invention.

In addition to the criteria used in the present invention, attention may thus also be directed to voltage curves 241 and 341 in diagrams 240 and 340 in FIGS. 2 and 3, respectively. Therefore, the development of appropriate voltages with reference to FIG. 4 is further explained, which shows the basic design of a voltage regulator, denoted overall by reference numeral 400, of an electric machine, for example electric machine 101 from FIG. 1, in a schematic view.

Such a voltage regulator 400 includes an excitation winding 401 having an inductance of 400 millihenrys, for example, via which a current flow (exciting current) is typically controlled with the aid of a two-position controller, based on the vehicle electrical system voltage. As soon as the vehicle electrical system voltage present at a terminal 402 is too low or is below a certain threshold, a current control valve 403, a metal oxide field effect transistor, for example, is controlled and thus conductively switched. This results in a current flow through excitation winding 401, as depicted by arrow 404. As soon as the voltage at the terminal is too high or is above a certain threshold, the control of current control valve 403 ends, and excitation winding 401 is disconnected from terminal 402. As depicted by an arrow 405, this results in a free-wheeling current from a ground terminal 406 via a diode 407, thus reducing the exciting current.

During regular rectifier operation, the applied voltage (whose curves 241 and 341 in diagrams 240 and 340 are shown in FIGS. 2 and 3, respectively) oscillates between two values at a switching point 408, which denotes the connecting point between the rotor and the controller. At arrow 405 corresponding to free-wheeling operation (i.e., when there is no connection of excitation winding 410 to terminal 402), the voltage is at the negative value of the diode voltage of diode 407. In contrast, the voltage is at the value present at terminal 402, i.e., for the vehicle electrical system voltage, when current control valve 403 is controlled and a conducting connection of switching point 408 to terminal 402 thus exists.

Returning to curve 241 depicted in diagram 240 in FIG. 2, it is apparent that both before and after time 3 ("second" point in time), the voltage values at switching point 408 (since curve 241 indicates these values) differ from the explained values. This is due to the fact that, for an exciting current of 0 amperes through excitation winding 401, switching point 408 is connected not to a voltage potential at low resistance, but, rather, merely to ground via the high inductance of excitation winding 401 (as mentioned, 400 millihenrys, for example). Voltages can thus be easily induced on the excitation winding. The times at which curve 241 differs from the regular values correlate exactly with the times at which the exciting current is 0 amperes.

In contrast, it is apparent from FIG. 3, in which, as mentioned, a case is illustrated in which the de-energization of the electric machine has not yet been achieved, that the voltage, apparent from curve 341 in diagram 340, is stable at less than 0 volts (the mentioned negative diode voltage). Observation of such a curve, i.e., the voltage present at terminal 402, is thus suitable for distinguishing the cases from FIGS. 2 and 3, i.e., as mentioned, for answering the question of whether the electric machine is already de-energized.

With reference to FIG. 5, a method according to one specific embodiment of the present invention is now explained, which is likewise suitable for distinguishing these two cases. A known additional circuit, denoted overall by reference numeral 500, of a current control valve 501, for example a field effect transistor, is illustrated in the high-side branch of an active converter (reference is made to FIG. 8 below for details), with which the arresting behavior can be effectuated between times 2 and 3 according to FIGS. 2 and 3 ("first" and "second" points in time). Additional circuit 500 includes an antiparallel diode 502 and a Zener diode 503, which are situated between gate G and drain D of current control valve 501. The breakdown voltage of Zener diode 503 is selected in such a way that it breaks down when a defined voltage value of a vehicle electrical system voltage present at a terminal 510 is exceeded, and gate G of current control valve 501 is thus controlled and current control valve 501 is conductively connected. Via a comparative evaluation of the voltage present at antiparallel diode 502, with the aid of a comparator 504, and detection of its output signal at a terminal 505, it can thus be recognized whether antiparallel diode 502 is conducting current, and thus, whether the arrest is active.

Alternatively, a comparative evaluation of the gate-source voltage can be carried out, using two comparators or amplifiers 506 and 507 and a decoupling resistor 508 (and evaluating an output signal at terminal 509). In the following discussion, amplifiers are assumed which are able to amplify only positive input voltages, and which in the case of negative input voltages deliver 0 volts as the output voltage. Such amplifiers are provided as amplifiers 506 and 507 in the illustrated example.

In the case of active rectification in the upper converter branch, phase voltage signal 520 is larger than the voltage signal of positive direct voltage terminal 510, and amplifier 506 delivers a positive signal at the output. As soon as the process has reached a steady state, current no longer flows into control terminal G of current control valve 501, and amplifier 507 detects no differential voltage at the input, resulting in an output signal of approximately 0 volts. In the case of active rectification in the lower converter branch, the phase voltage signal present at terminal 520 is close to 0 volts, and amplifier 506 delivers an output signal of approximately 0 volts, the same as amplifier 507. In the case of arresting, i.e., a voltage between terminals 520 and 510 that exceeds the arresting voltage at terminal 503 and the threshold voltage at current control valve 501, amplifier 506 delivers an output voltage of 0 volts, while a voltage near the threshold voltage is set via the arresting path at control terminal G of current control valve 501. This voltage difference is apparent at the input of amplifier 507 and at output 509. It can thus be clearly recognized at output 509 whether the circuit is arrested.

Figure 6:
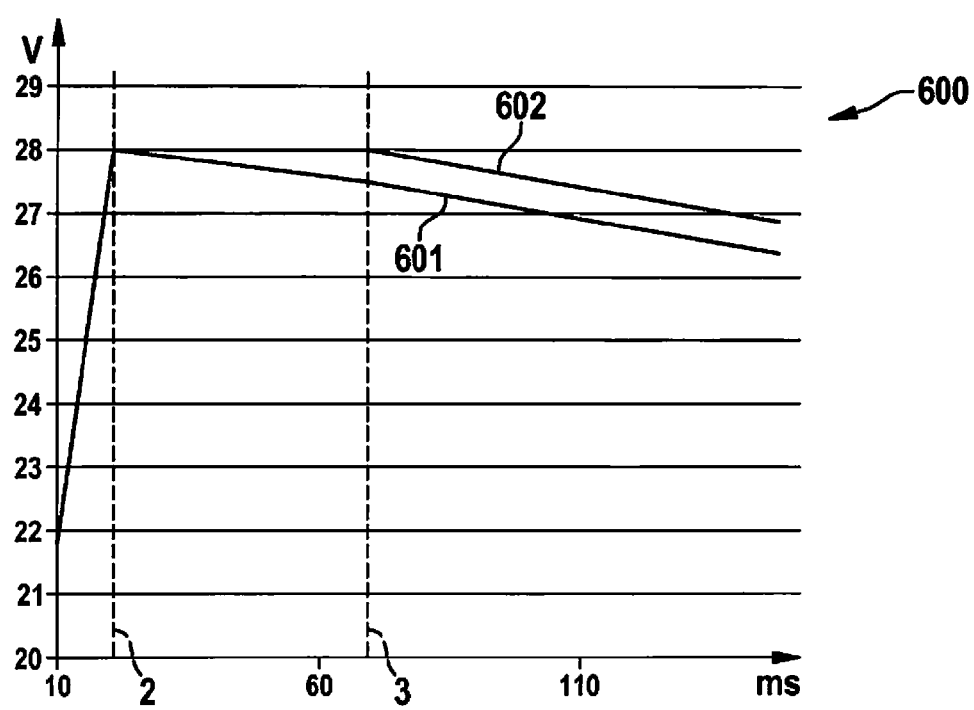
FIG. 6 shows a voltage curve of a vehicle electrical system voltage during and after activation of an arresting function, in a detailed view, according to an example embodiment of the present invention.

Another possible test according to one specific embodiment of the present invention is depicted with reference to FIG. 6, in which curves 601 and 602 of a vehicle electrical system voltage for a (largely) de-energized electric machine (curve 601) and for an electric machine that is not yet, or is hardly, de-energized (curve 602) are depicted. Curves 601 and 602 are plotted in a diagram 600 in volts on the ordinate with respect to time in microseconds on the abscissa. Curves 601 and 602 may be regarded as detailed views of curves 211 and 311 according to FIGS. 2 and 3, respectively; in addition, times 2 and 3 are correspondingly denoted.

It is apparent that at time 3, in the case of the (largely) de-energized electric machine (curve 601), the vehicle electrical system voltage has dropped significantly below the value at time 2. In contrast, in the case of the electric machine that is not yet, or is hardly, de-energized (curve 602), the value at time 3 is still essentially the same as at time 2. A distinction can thus be made between the two cases, also based on an evaluation of the vehicle electrical system voltage, as mentioned.

Figure 7:
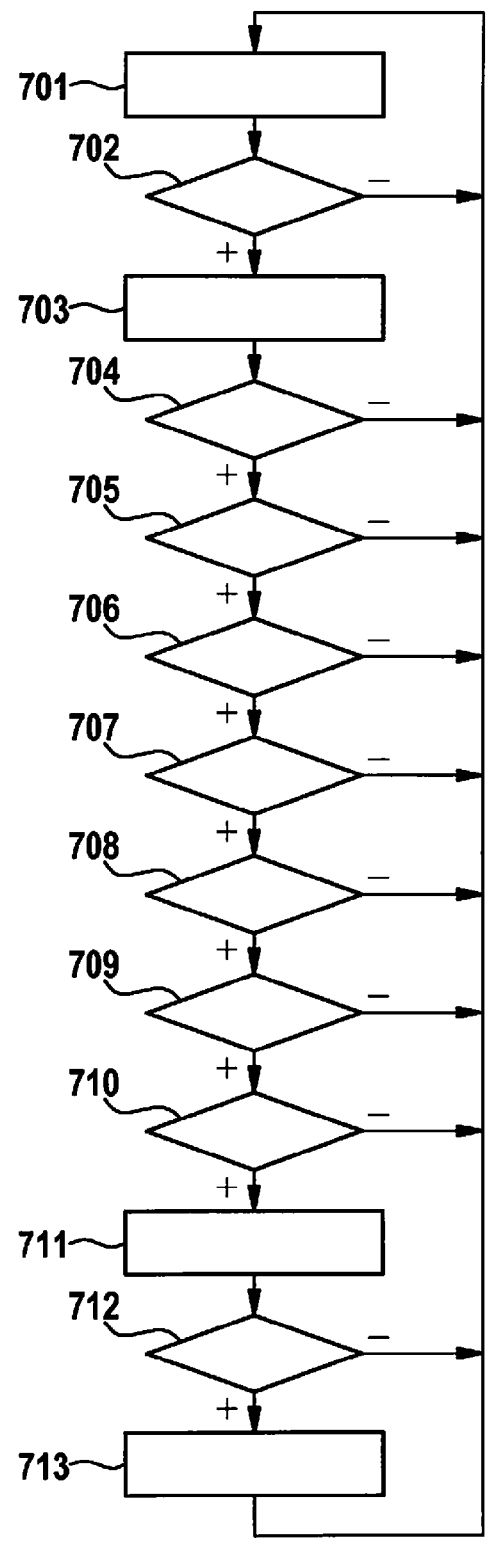
FIG. 7 is a flowchart that illustrates a method according to an example embodiment of the present invention.

FIG. 7 depicts a method according to one specific embodiment of the present invention in the form of a schematic flowchart. The method begins in a state that is depicted by reference numeral 701, in which an active converter carries out regular rectification. If it is recognized in a test step 702 that a vehicle electrical system voltage has reached a predefined value for activating an arresting function (+), for example 24 volts (within the scope of the present patent application, referred to as the "first" threshold value), a dead time of, for example, 50 microseconds, is initially awaited in a step 703. The beginning of this dead time corresponds to what is referred to within the scope of the present patent application as the "first" point in time, and the end of this dead time corresponds to the "second" point in time. An arresting function, for example, can be activated between the "first" and the "second" points in time (times 2 and 3 of the figures explained above). After the end of the dead time, i.e., at the second point in time, test steps 704 through 710 are now carried out, (partially) in alternation and/or (partially) cumulatively. In contrast, if it is recognized in test step 702 that a vehicle electrical system voltage is not above a predefined value for initiating a phase short circuit, i.e., for activating a load shedding reaction (−), for example above 24 volts, the method is continued with state 701.

In contrast to the illustration in FIG. 7, more or fewer of test steps 704 through 710 can be provided. Within the scope of one specific embodiment of the present invention, test steps 704 through 710 include the determination of whether at the second point in time, i.e., at the end of the dead time according to step 703, the voltage arrest, which has been explained several times, is still activated, and/or the voltage potential has not yet dropped below the first threshold value, and/or a value that indicates a current flowing through at least one of the phase terminals is above a third threshold value. In addition, test steps 704 through 710 can include the determination of whether a voltage potential present at the supply side of an excitation winding of the electric machine (excitation winding 401 according to FIG. 4, terminal 408) is between the voltage potential of the vehicle electrical system voltage and a ground potential, when the excitation winding is disconnected from the voltage potential of the vehicle electrical system voltage, and/or a current flowing through the excitation winding is below a corresponding current threshold value, and/or after a load shedding reaction is activated for the first time, after the further load shedding reactions have been activated, more than a predefined period of time has elapsed and/or more than a predefined number of load shedding reactions have been activated. If one or more of these conditions are met, a load shedding reaction in the form of a phase short circuit is initiated in a step 711.

As long as it is determined in a test step 712 that the vehicle electrical system voltage has not yet dropped to a predefined value for deactivating the load shedding reaction, referred to here as the "second" threshold value (+), a further dead time of 50 microseconds, for example, is awaited in a step 713 before the method returns to state 701. Otherwise (−), the method returns directly to state 701. Likewise, the method returns directly to state 701, but without a load shedding reaction according to step 711 being initiated beforehand, when a negative determination (−) is made in one or more of test steps 704 through 710.

For further explanation, FIG. 8 schematically depicts an electric machine, denoted by reference numeral 101 as in FIG. 1, together with an active converter 102 connected thereto.

Electric machine 101 includes a five-phase stator 11 designed as a pentagram circuit, and a rotor that includes an excitation winding 401. The individual windings of stator 11 and of rotor 12 are not separately designated. A generator controller, as denoted by reference numeral 400 in FIG. 4, evaluates a vehicle electrical system voltage between a first direct voltage terminal B+ and a second direct voltage terminal B− (second direct voltage terminal B− can be connected to ground) and, as explained for FIG. 4, controls the output power of electric machine 101. First direct voltage terminal B+ therefore corresponds to terminal 402 according to FIG. 4, and the second direct voltage terminal corresponds to terminal 406.

Electric machine 101 is connected to first direct voltage terminal B+ and to second direct voltage terminal B− via five phase terminals U through Y, in each case via controllable current control valves that can be switched on and off, referred to here as reference characters UL through YL and UH through YH. Current control valves UH through YH form an upper rectifier branch ("high side"), and current control valves UL through YL form a lower rectifier branch ("low side"). Each of current control valves UH through YH can therefore include an additional circuit 500, as depicted in FIG. 5, and can thus form current control valve 501 depicted in FIG. 5. In this case, each of phase terminals U through Y forms a terminal 520 according to FIG. 5, and first direct voltage terminal B+ forms terminal 510 depicted in FIG. 5.

For simplicity, controllable current control valves UH through YH which can be switched on and off are depicted in FIG. 6 as switches with Zener diodes connected in parallel. The Zener diodes symbolize the typical breakdown property, beginning at a certain drain-source voltage, due to a circuit such as that shown in FIG. 5, for example, or also the avalanche voltage, as well as the inverse diodes that are typically present. A simple diode is illustrated in each case in lower branch UL through YL, since in the illustrated example the arresting mode is not provided here. As mentioned, an arresting function can instead be provided in the other branch of the converter, and the initiation of phase short circuits takes place in each case with the aid of the current control valves that are not provided with the arresting function.

Current control valves UH through YH and UL through YL are controllable by respective decentralized control devices 21 through 25, depicted here with dashed-line control arrows. Additional circuit 500 depicted in FIG. 5 can be integrated into control devices 21 through 25. Centralized control of all current control valves UH through YH and UL through YL can also be provided.

What is claimed is:

1. A method of operation of an active converter connected to an electric machine, wherein the electric machine includes a plurality of phase terminals that are each connected to (a) a first direct voltage terminal via at least one controllable current control valve of a first converter branch and to (b) a second direct voltage terminal via at least one controllable current control valve of a second converter branch, wherein, for each of the at least one controllable current control valve of the first converter branch, a respective arresting circuit is configured to activate a voltage arrest beginning at a first time after which a voltage potential present at the first direct voltage terminal increases up to a predefined first threshold value, and wherein the voltage arrest (a) is kept activated as long as the voltage potential present at the first direct voltage terminal does not drop below the first threshold value and (b) includes controlling the at least one current control valve of the first converter branch and thereby establishing a conducting connection between the phase terminals and the first direct voltage terminal, the method comprising:
conditional upon satisfaction of activation conditions and beginning at a second time when the voltage potential present at the first direct voltage terminal is above a second threshold value, activating, by the active converter, a load shedding reaction that includes controlling all current control valves of the second converter branch and thereby establishing a conducting connection between all of the phase terminals, wherein the second time is after the first time, the second threshold value is less than the first threshold value, and the activation conditions include at least one of (a) that the voltage arrest is still activated at the second time, (b) that the voltage potential at the first direct voltage terminal has not yet dropped below the first threshold value, and (c) that a value that indicates a current flowing through at least one of the phase terminals is above a third threshold value.

2. The method of claim 1, wherein, with respect to each of the arresting circuits, via the respective arresting circuit, the first direct voltage terminal is connected via a threshold value circuit to a control terminal of the respective current control valve of the respective arresting circuit, the threshold value circuit activating the voltage arrest by controlling the control terminal when the voltage potential increases to the first threshold value and keeping the voltage arrest activated by continuing to control the control terminal as long as the voltage potential does not drop below the first threshold value.

3. The method of claim 2, further comprising determining that the voltage arrest is still activated at the second time by ascertaining whether a current is flowing across the threshold value circuit.

4. The method of claim 1, further comprising determining that the voltage potential has not yet dropped below the first threshold value at the second time by measuring the voltage potential at least at the second point in time.

5. The method of claim 4, wherein the voltage potential is repeatedly measured between the first time and the second time.

6. The method of claim 1, further comprising ascertaining the value that indicates the current flowing through the at least one phase terminal at the second time based on a current measurement in the at least one phase terminal.

7. The method of claim 1, further comprising ascertaining the value that indicates the current flowing through the at least one phase terminal at the second time based on a maximum value of the current flowing through the at least one phase terminal or based on a sum of positive current components in at least two phase terminals.

8. A control unit for operating a circuit that includes an electric machine, wherein the electric machine includes a plurality of phase terminals that are each connected to (a) a first direct voltage terminal via at least one controllable current control valve of a first converter branch and to (b) a second direct voltage terminal via at least one controllable current control valve of a second converter branch, wherein, for each of the at least one controllable current control valve of the first converter branch, a respective arresting circuit is configured to activate a voltage arrest beginning at a first time after which a voltage potential present at the first direct voltage terminal increases up to a predefined first threshold value, and wherein the voltage arrest (a) is kept activated as long as the voltage potential present at the first direct voltage terminal does not drop below the first threshold value and (b) includes controlling the at least one current control valve of the first converter branch and thereby establishing a conducting connection between the phase terminals and the first direct voltage terminal, the control unit comprising:

processing circuitry connectable to the circuit, wherein the processing circuitry is configured to, conditional upon satisfaction of activation conditions and beginning at a second time when the voltage potential present at the first direct voltage terminal is above a second threshold value, activate a load shedding reaction that includes controlling all current control valves of the second converter branch and thereby establishing a conducting connection between all of the phase terminals, wherein the second time is after the first time, the second threshold value is less than the first threshold value, and the activation conditions include at least one of (a) that the voltage arrest is still activated at the second time, (b) that the voltage potential at the first direct voltage terminal has not yet dropped below the first threshold value, and (c) that a value that indicates a current flowing through at least one of the phase terminals is above a third threshold value.

9. A non-transitory computer-readable medium on which are stored instructions that are executable by a processor and that, when executed by the processor, cause the processor to perform a method for operating a circuit that includes an electric machine, wherein the electric machine includes a plurality of phase terminals that are each connected to (a) a first direct voltage terminal via at least one controllable current control valve of a first converter branch and to (b) a second direct voltage terminal via at least one controllable current control valve of a second converter branch, wherein, for each of the at least one controllable current control valve of the first converter branch, a respective arresting circuit is configured to activate a voltage arrest beginning at a first time after which a voltage potential present at the first direct voltage terminal increases up to a predefined first threshold value, and wherein the voltage arrest (a) is kept activated as long as the voltage potential present at the first direct voltage terminal does not drop below the first threshold value and (b) includes controlling the at least one current control valve of the first converter branch and thereby establishing a conducting connection between the phase terminals and the first direct voltage terminal, the method comprising:

conditional upon satisfaction of activation conditions and beginning at a second time when the voltage potential present at the first direct voltage terminal is above a second threshold value, activating a load shedding reaction that includes controlling all current control valves of the second converter branch and thereby establishing a conducting connection between all of the phase terminals, wherein the second time is after the first time, the second threshold value is less than the first threshold value, and the activation conditions include at least one of (a) that the voltage arrest is still activated at the second time, (b) that the voltage potential at the first direct voltage terminal has not yet dropped below the first threshold value, and (c) that a value that indicates a current flowing through at least one of the phase terminals is above a third threshold value.

10. A system comprising:

a first converter branch;

a second converter branch, wherein each of the first and second converter branches includes at least one respective controllable current control valve;

an electric machine that includes a plurality of phase terminals that are each connected to (a) a first direct voltage terminal via the at least one controllable current control valve of the first converter branch and to (b) a second direct voltage terminal via the at least one controllable current control valve of the second converter branch;

for each of the at least one controllable current control valve of the first converter branch, a respective arresting circuit that is configured to activate a voltage arrest beginning at a first time after which a voltage potential present at the first direct voltage terminal increases up to a predefined first threshold value, wherein the voltage arrest (a) is kept activated as long as the voltage potential present at the first direct voltage terminal does not drop below the first threshold value and (b) includes controlling the at least one current control valve of the first converter branch and thereby establishing a conducting connection between the phase terminals and the first direct voltage terminal; and an active converter connected to an electric machine, wherein:

the active converter is configured to, conditional upon satisfaction of activation conditions and beginning at a second time when the voltage potential present at the first direct voltage terminal is above a second threshold value, activate a load shedding reaction that includes controlling all current control valves of the second converter branch and thereby establishing a conducting connection between all of the phase terminals;

the second time is after the first time;

the second threshold value is less than the first threshold value; and the activation conditions include at least one of (a) that the voltage arrest is still activated at the second time, (b) that the voltage potential at the first direct voltage terminal has not yet dropped below the first threshold value, and (c) that a value that indicates a current flowing through at least one of the phase terminals is above a third threshold value.

* * * * *